(12) United States Patent
Fu

(10) Patent No.: US 12,641,623 B2
(45) Date of Patent: May 26, 2026

(54) METHOD AND APPARATUS FOR TRANSMITTING CONFIGURATION INFORMATION OF PHYSICAL DOWNLINK CONTROL CHANNEL, AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 296 days.

(21) Appl. No.: 18/549,004

(22) PCT Filed: Mar. 18, 2021

(86) PCT No.: PCT/CN2021/081481
§ 371 (c)(1),
(2) Date: Sep. 5, 2023

(87) PCT Pub. No.: WO2022/193219
PCT Pub. Date: Sep. 22, 2022

(65) Prior Publication Data
US 2024/0155645 A1      May 9, 2024

(51) Int. Cl.
*H04W 72/232*          (2023.01)
*H04W 72/0446*        (2023.01)
(Continued)

(52) U.S. Cl.
CPC ..... *H04W 72/232* (2023.01); *H04W 72/0446* (2013.01); *H04W 72/0453* (2013.01); *H04L 5/0007* (2013.01)

(58) Field of Classification Search
CPC ........... H04W 72/232; H04W 72/0446; H04W 72/0453; H04L 5/0007; H04L 5/0094; H04L 5/0053
See application file for complete search history.

(56) References Cited

U.S. PATENT DOCUMENTS

2017/0331577 A1* 11/2017 Parkvall .............. H04L 27/2602
2020/0008228 A1*  1/2020 Lee ........................ H04W 72/21
(Continued)

FOREIGN PATENT DOCUMENTS

CN         110536453 A    12/2019
WO    WO 2012146095 A1   10/2020

OTHER PUBLICATIONS

Office Action issued by the Russian Federation Federal Institute of Industrial Property on Apr. 12, 2024, in corresponding Application No. RU 2023124687/07 (16 pages).
(Continued)

*Primary Examiner* — Dady Chery
(74) *Attorney, Agent, or Firm* — Finnegan, Henderson, Farabow, Garrett & Dunner, L.L.P.

(57)          ABSTRACT

A method for transmitting configuration information of a physical downlink control channel (PDCCH) is performed by a network device, and includes: sending the configuration information of the PDCCH to a user equipment, wherein the configuration information of the PDCCH indicates a first time-frequency resource, and the first time-frequency resource is configured to send the PDCCH and is located in a plurality of consecutive time domain units of a group of multi-slot.

18 Claims, 3 Drawing Sheets

Wireless communication system 100

102 downlink uplink

101

(51) Int. Cl.
  H04W 72/0453     (2023.01)
  H04L 5/00       (2006.01)

(56)            References Cited

U.S. PATENT DOCUMENTS

| | | | |
|---|---|---|---|
| 2020/0092880 A1* | 3/2020 | Choi .................. | H04L 27/2602 |
| 2020/0120482 A1 | 4/2020 | Parkvall et al. | |
| 2020/0137730 A1* | 4/2020 | Zhang .................. | H04W 72/23 |
| 2022/0104267 A1* | 3/2022 | Gao .................. | H04W 72/1268 |
| 2023/0053253 A1* | 2/2023 | Yeo ....................... | H04L 5/0055 |

OTHER PUBLICATIONS

Extended European Search Report Issued in Application No. 21930811.1 dated Apr. 18, 2024, 9 pages.
First Office Action issued by the State Intellectual Property Office of People's Republic of China on Feb. 22, 2025, in corresponding Application No. CN 202180000775.7, 11 pages.
Office Action issued by the India Patent Office on Dec. 6, 2024, in corresponding Application No. IN2023-47065568, 6 pages.
"PDCCH monitoring enhancement for NR 52.6-71 GHz", Xiaomi. 3GPP TSG RAN WG1 #104, R-2101110, e-Meeting, Jan. 25-Feb. 5, 2021. 3GPP.org.
"PDCCH monitoring enhancements for NR from 52.6 GHz to 71GHz", Lenovo et al.,3GPP TSG RAN WG1 Meeting #104-e, R1-2100058, e-Meeting, Jan. 25-Feb. 5, 2021. 3GPP.org.
Office Action dated Jul. 8, 2024, for Japanese Application No. 2023-557441.
International Search Report and Written Opinion of International Application No. PCT/CN2021/081481, dated Dec. 1, 2021, 11 pages.
ZTE, Sanechips, "Discussion on the PDCCH monitoring enhancements for 52.6 to 71 GHz", 3GPP TSG RAN WG1 #104-e, R1-2100074, e-Meeting, Jan. 25-Feb. 5, 2021, 4 pages.
LG Electronics, "PDCCH monitoring enhancements to support NR above 52.6 GHz", 3GPP TSG RAN WG1 #104-e, R1-2100893, e-Meeting, Jan. 25-Feb. 5, 2021, 6 pages.
Office Action issued by the Korean Patent Office on Nov. 17, 2025, in corresponding KR Application No. 10-2023-7034837, 11 pages.
3rd Generation Partnership Project; Technical Specification Group Radio Access Network; NR; Radio Resource Control (RRC) protocol specification (Release 16), 3GPP TS 38.331 V16.3.1, (Jan. 2021), 936 pages.
"Enhancement on PDCCH monitoring", Huawei, HiSilicon, 3GPP TSG RAN WG1 Meeting #104-e, R1-2100241, E-meeting, Jan. 25-Feb. 5, 2021, 5 pages.

* cited by examiner

Wireless communication system 100

102 downlink

101 uplink network device

UE

S201, send configuration information of a PDCCH

S202, receive the configuration information of the PDCCH

<u>300</u>

<u>400</u>

<u>500</u> process module ⌐502        transceiver module ⌐501

<u>600</u>

604

Memory

602 processing component processor

620

606 power component

608 multimedia component

610 audio component

I/O interface

612 communication component

616 sensor component

614

METHOD AND APPARATUS FOR TRANSMITTING CONFIGURATION INFORMATION OF PHYSICAL DOWNLINK CONTROL CHANNEL, AND STORAGE MEDIUM

CROSS REFERENCE TO RELATED APPLICATIONS

This application a U.S. national phase of International Application No. PCT/CN2021/081481, filed on Mar. 18, 2021, the entire contents of which are incorporated herein by reference.

TECHNICAL FIELD

The disclosure relates to a field of wireless communication technologies, in particular to a method and an apparatus for transmitting configuration information of a physical downlink control channel (PDCCH) and a readable storage medium.

BACKGROUND

In the R15, monitoring capability of the PDCCH is defined by taking a single slot as a time unit. In detail, the monitoring capability of the UE in each slot is defined according to a subcarrier spacing (SCS). The monitoring capability of the UE in a slot includes a maximum number of monitoring times in the slot, and a maximum number of non-overlapping control channel elements (CCEs) in the slot. The above definition can be applied to frequencies less than 52.6 GHZ. The optional subcarrier bandwidths may be 15 KHz, 30 KHz, 60 KHz, or 120 KHz. A duration of a slot varies with the subcarrier bandwidth. As the subcarrier bandwidth increases, the duration of the slot becomes shorter.

In a high frequency band (for example, a frequency band around 60 GHz), in order to cope with phase noise, a large subcarrier bandwidth is usually selected, such as 960 KHz. The larger the subcarrier bandwidth, the shorter a duration (the duration herein refers to the duration of the slot) is. For example, when a subcarrier bandwidth is 960 KHz, a duration of a corresponding slot is $\frac{1}{64}$ ms, and the UE may be unable to monitor the PDCCH in all the slots during this shorter duration.

SUMMARY

According to a first aspect of the disclosure, a method for transmitting configuration information of a PDCCH, performed by a network device, is provided.

The method includes: sending the configuration information of the PDCCH to a UE, in which the configuration information of the PDCCH indicates a first time-frequency resource, and the first time-frequency resource is configured to send the PDCCH and is located in a plurality of consecutive time domain units of a group of multi-slot.

According to a second aspect of the disclosure, a method for transmitting configuration information of a PDCCH, performed by a UE, is provided.

The method includes: receiving the configuration information of the PDCCH from a network device, in which the configuration information of the PDCCH indicates a first time-frequency resource, and the first time-frequency resource resource is configured to send the PDCCH and is located in a plurality of consecutive time domain units of a group of multi-slot.

According to a third aspect of the disclosure, a network device is provided. The network device includes: a processor, and a memory configured to store computer programs. The processor is configured to execute the computer programs to perform the method in the first aspect.

According to a fourth aspect of the disclosure, a user equipment is provided. The user equipment includes: a processor, and a memory configured to store computer programs. The processor is configured to execute the computer programs to perform the method in the second aspect.

According to a fifth aspect of the disclosure, a non-transitory computer-readable storage medium having instructions (computer programs, or programs) stored thereon is provided. When the instructions are executed by a processor of a network device, the network device is caused to perform the method in the first aspect.

According to a sixth aspect of the disclosure, a non-transitory computer-readable storage medium having instructions (computer programs, or programs) stored thereon is provided. When the instructions are executed by a processor of a user equipment, the user equipment is caused to perform the method in the second aspect.

It is understandable that the above general description and the following detailed descriptions are illustrative and explanatory only and are not used to limit embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the embodiments of the disclosure.

DETAILED DESCRIPTION

Figure 1:
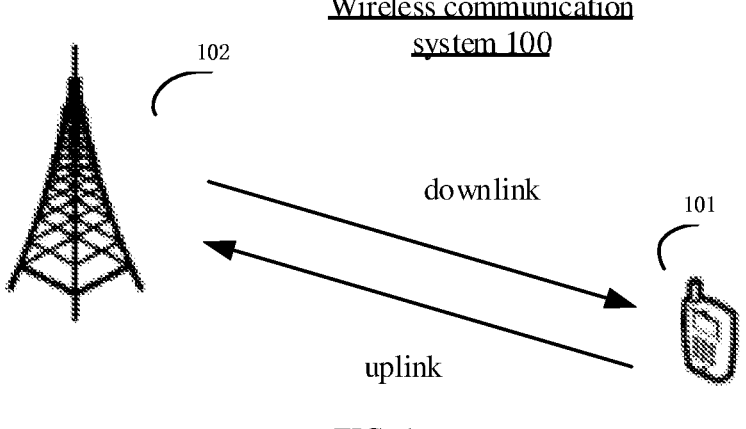
FIG. 1 is a schematic diagram of a wireless communication system architecture provided by an embodiment of the disclosure.

Embodiments of the disclosure will now be further described in combination with the accompanying drawings and specific implementations.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the embodiments of the disclosure. Instead, they are merely examples of apparatuses and methods consistent with aspects related to the disclosure as recited in the appended claims.

In new radio (NR), downlink data is carried on a physical downlink shared channel (PDSCH), and uplink data is carried on a physical uplink shared channel (PUSCH). A base station schedules the PDSCH and the PUSCH through downlink control information (DCI) carried on a physical downlink control channel (PDCCH).

The PDCCH includes a common search space (CSS) and a user equipment (UE) specific search space (USS). The CSS is configured to carry information such as cell common control information and multicast control information, and may also be configured to carry UE specific control information. The USS is configured to carry the UE specific control information.

In the R15, monitoring capability of the PDCCH is defined by taking a single slot as a time unit. In detail, the monitoring capability of the UE in each slot is defined according to a subcarrier spacing (SCS). The monitoring capability of the UE in a slot includes a maximum number of monitoring times in the slot, and a maximum number of non-overlapping control channel elements (CCEs) in the slot. The above definition can be applied to frequencies less than 52.6 GHZ. The optional subcarrier bandwidths may be 15 KHz, 30 KHz, 60 KHz, or 120 KHz. A duration of a slot varies with the subcarrier bandwidth. For example, a duration of a slot corresponding to a subcarrier bandwidth of 15 KHz is 1 millisecond (ms), a duration of a slot corresponding to a subcarrier bandwidth of 30 KHz is 0.5 ms, and a duration of a slot duration corresponding to a subcarrier bandwidth of 60 KHz is 0.25 ms, and so on. As the subcarrier bandwidth increases, the duration of the slot becomes shorter.

In a high frequency band (for example, a frequency band around 60 GHz), in order to cope with phase noise, a large subcarrier bandwidth is usually selected, such as 960 KHz. The larger the subcarrier bandwidth, the shorter a duration (the duration herein refers to the duration of the slot) is. For example, when a subcarrier bandwidth is 960 KHz, a duration of a corresponding slot is $1/64$ ms, and the UE may be unable to monitor the PDCCH in all the slots during this shorter duration.

In conclusion, when using a large SCS, the UE may be unable to complete monitoring the PDCCH in each time domain unit, which affects an effect of the UE monitoring the PDCCH and a reception of the PDCCH, and thus the processing performance of the terminal is degraded and needs to be optimized.

In view of this, the embodiments of the disclosure provide a method for transmitting configuration information of a physical downlink control channel (PDCCH), an apparatus, a device and a readable storage medium, so as to save energy for the user equipment (UE).

As illustrated in FIG. 1, the method for transmitting configuration information of a physical downlink control channel (PDCCH) provided by the embodiment of the disclosure may be performed by a wireless communication system 100. The wireless communication system may include a terminal device 101 and a network device 102. The terminal device 101 is configured to support carrier aggregation. The terminal device 101 may be connected to multiple carrier units of the network device 102, the multiple carrier units including a primary carrier unit and one or more secondary carrier units.

It should be understood that the above wireless communication system 100 can be applied to both low frequency (sub 6G) scenarios and high frequency (above 6G) scenarios. Application scenarios of the wireless communication system 100 include, but are not limited to, a long term evolution (LTE) system, a LTE frequency division duplex (FDD) system, a LTE time division duplex (TDD) system, a worldwide interoperability for micro wave access (WiMAX) communication system, a cloud radio access network (CRAN) system, and a future 5th-Generation (5G) system, a new radio (NR) communication system, and a future evolved public land mobile network (PLMN) system.

The terminal device 101 shown above may be a user equipment (UE), a terminal, an access terminal, a terminal unit, a terminal station, a mobile station (MS), a remote station, a remote terminal, a mobile terminal, a wireless communication device, a terminal agent, or a terminal device. The terminal device 101 may have a wireless transceiver function, which is capable of communicating (e.g., wirelessly communicating) with one or more network devices of one or more communication systems and accepting network services provided by the network devices. The network devices include, but are not limited to, the illustrated network device 102.

The terminal device 101 may be a cellular telephone, a cordless phone, a session initiation protocol (SIP) phone, a wireless local loop (WLL) station, a personal digital assistant (PDA) device, a handheld device with a wireless communication function, a computing device or other processing devices connected to a wireless modem, an in-vehicle device, a wearable device, a terminal device in future 5G networks, or a terminal device in future evolved PLMN networks.

The network device 102 may be an access network device (or an access network site). The access network device refers to a device that provides a network access function, such as a radio access network (RAN) base station. The network device 102 may include a base station (BS), or include a BS and a wireless resource management device for controlling the BS. The network device 102 may also include a relay station (relay device), an access point, and a BS in future 5G networks, a BS in future evolved PLMN networks, or a NR BS. The network device 102 may be a wearable device or an in-vehicle device. The network device 102 may also be a communication chip including a communication module.

For example, the network device 102 includes, but is not limited to, a next generation BS (gnodeB, gNB) in 5G, an evolved node B (eNB) in a LTE system, a radio network controller (RNC), a node B (NB) in a Wideband Code Division Multiple Access (WCDMA) system, a wireless controller in a CRAN system, a BS controller (BSC), a base transceiver station (BTS) in a Global System for Mobile Communications (GSM) system or a Code Division Multiple Access (CDMA) system, a home BS (e.g., home evolved nodeB, or home node B, HNB), a baseband unit (BBU), a transmitting and receiving point (TRP), a transmitting point (TP), or a mobile switching center.

Taking NR as an example, a processing principle of the terminal device 101 for the PDCCH is that the terminal device 101 monitors the PDCCH sent by the network device 102 in one or more search spaces (SSs) to receive DCI carried by the PDCCH (the DCI may also be referred to as control information for simplicity of illustration in the disclosure). The SS is a set of candidate locations where the terminal device 101 needs to monitor the PDCCH. The SS includes a common search space (CSS) and a UE specific search space (USS). The NR introduces a concept of control resource set (CORESET) for the PDCCH. A CORESET is a candidate time-frequency resource for the terminal device 101 to try to use one or more SSs to detect the PDCCH, and the CORESET may include multiple consecutive resource blocks in the frequency domain and multiple consecutive symbols in the time domain. A time-frequency location of the CORESET can be located any location of a bandwidth part (BWP) or a slot. The time-frequency location of the CORESET can be semi-statically configured by the network device 102 side through a high-layer signaling.

The resources used by a PDCCH are composed of one or more control channel elements (CCEs) aggregated in one CORESET, and the number of one or more CCEs corresponds to an aggregation level (AL) of the PDCCH. Currently, there is a correspondence between an aggregation level of the PDCCH supported by the NR and the number of CCEs used by the PDCCH. One CCE may be composed of 6 resource element groups (REGs), and each REG includes one symbol in the time domain and one resource block (RB) in the frequency domain. One RB may include 12 resource elements (REs) in the frequency domain. When monitoring a PDCCH sent by the network device 102, the terminal device 101 may detect each possible aggregation level of the PDCCH at each candidate location of the PDCCH configured by the network device 102. Therefore, in the case of an unknown aggregation level of the PDCCH, the terminal device 101 performs monitoring multiple times at each candidate location.

The embodiment of the disclosure introduces a multi-slot PDCCH monitoring pattern, and in this mode, a group of multi-slot or a multi-slot PDCCH monitoring span corresponding to PDCCH monitoring is introduced. The group of multi-slot includes a plurality of time domain units, and the multi-slot PDCCH monitoring span includes a plurality of time domain units, and the time domain unit is a slot or half of a slot.

The group of multi-slot or the multi-slot PDCCH monitoring span corresponding to PDCCH monitoring represent the same concept, which are different ways of describing the same concept. The group of multi-slot in the disclosure can also be replaced by the multi-slot PDCCH monitoring span.

In the multi-slot PDCCH monitoring pattern, not all time domain units of a group of multi-slot are configured with a PDCCH, but some of the time domain units are configured with the PDCCH. For example, one or more of the slots of the group of multi-slot are configured with the PDCCH, and other slots are not configured with the PDCCH. A slot configured with a PDCCH may be referred to as PDCCH slot. In this multi-slot PDCCH monitoring pattern, the PDCCH monitoring capability is defined in units of groups of multi-slot.

Figure 2:
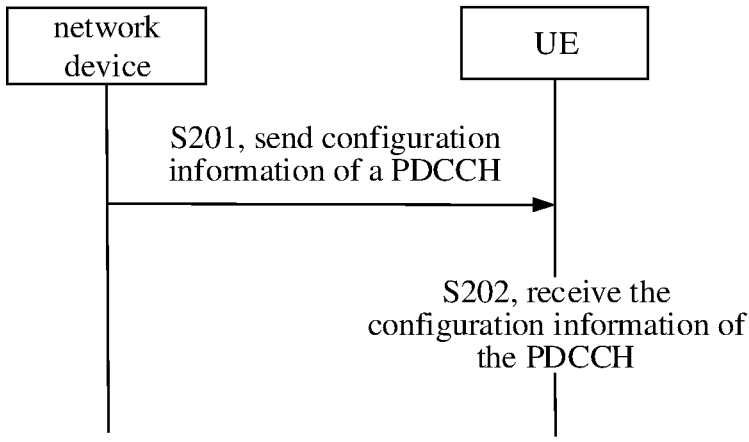
FIG. 2 is a flowchart of a method for transmitting configuration information of a physical downlink control channel (PDCCH) provided by an embodiment of the disclosure.

A method for transmitting configuration information of a PDCCH is provided by the embodiment of the disclosure. As illustrated in FIG. 2, FIG. 2 is a flowchart of a method for transmitting configuration information of a PDCCH provided by an embodiment of the disclosure. As illustrated in FIG. 2, the method includes the following steps.

At step S21, the network device 102 sends the configuration information of the PDCCH to the UE 101, in which the configuration information of the PDCCH is configured to indicate a first time-frequency resource, and the first time-frequency resource is configured to send the PDCCH and is located in a plurality of consecutive time domain units of a group of multi-slot.

At step S22, the UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

The first time-frequency resource is located in multiple consecutive time domain units of the group of multi-slot, it can be understood that the multiple time domain units occupied by the first time-frequency resource are part of the consecutive time-frequency resources of the group of multi-slot.

In an implementation, the time domain unit is a slot.

In an implementation, the time domain unit is half of a slot.

In an implementation, after sending the configuration information of the PDCCH to the UE 101, the network device 102 sends the PDCCH on the first time-frequency resource. The UE 101 receives the PDCCH on the first time-frequency resource.

In an example, the group of multi-slot includes 8 slots in total. The network device 102 sends the configuration information of the PDCCH to the UE 101. The first time-frequency resource indicated by the configuration information is the 1st, 2nd, 3rd, and 4th slots of the 8 slots, and each of the 1st, 2nd, 3rd, and 4th slots corresponds to a PDCCH. The network device 102 sends corresponding 4 PDCCHs on the 1st to 4th slots of the 8 slots. The UE 101 receives the configuration information of the PDCCH from the network device 102 and receives the 4 PDCCHs on the 1st to 4th slots of the 8 slots.

In the embodiment of the disclosure, by configuring the first time-frequency resource for sending the PDCCH to be located on the plurality of consecutive time domain units of the group of multi-slot, the UE 101 can continuously receive the PDCCH on the consecutive time domain units, which provides the UE 101 with the possibility of energy saving and facilitates the energy saving of the UE 101 as compared to receiving the PDCCH from spaced time domain units.

It should be noted that in the embodiment of the disclosure, the first time-frequency resource is consecutively distributed on the consecutive time domain resources of the group of multi-slot, in the hope that the UE 101 receives the PDCCHs in a more concentrated period of time, so that after the UE 101 completes the action of receiving the PDCCH, it can turn off some of the radio frequency devices to save energy. The processing for the PDCCH performed by the UE 101 does not have to be synchronized with the reception of the PDCCH, it may be synchronized during the reception of the PDCCH or executed after the reception of the PDCCH is completed. The embodiment of the disclosure provides a possibility for the UE 101 to save energy, and the UE 101 with a good executive function can determine whether to enter an energy saving mode according to its own capability after receiving all the PDCCHs in the group of multi-slot. The embodiment of the disclosure does not strictly stipulate that the UE 101 must perform the operation of switching to the energy saving mode.

A method for transmitting configuration information of a PDCCH is provided by the embodiment of the disclosure. The method includes the following steps.

The network device 102 sends the configuration information of the PDCCH to the UE 101, in which the configuration information of the PDCCH is configured to indicate a first time-frequency resource, and the first time-frequency resource is configured to send the PDCCH and is located in a plurality of consecutive time domain units of a group of multi-slot.

The UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units in the group of multi-slot.

A maximum number of time domain units occupied by the first time-frequency resource in time-frequency resources of the group of multi-slot relates to a number of time domain units included in the time-frequency resources of the group of multi-slot.

In an implementation, the maximum number of time domain units occupied by the first time-frequency resource in the time-frequency resources of the group of multi-slot is positively correlated with the number of time domain units included in the time-frequency resources of the group of multi-slot. That is, the larger the maximum number of time domain units occupied by the first time-frequency resource in the time-frequency resources of the group of multi-slot, the larger the number of time domain units included in the time-frequency resources of the group of multi-slot, and the smaller the maximum number of time domain units occupied by the first time-frequency resource in the time-frequency resources of the group of multi-slot, the smaller the number of time domain units included in the time-frequency resources of the group of multi-slot.

In an example, the number of slots included in the time-frequency resources of the group of multi-slot is 4, and the maximum number of time domain units occupied by the first time-frequency resource in the time-frequency resources of the group of multi-slot is 2; and the number of slots included in the time-frequency resources of the group of multi-slot is 8, and the maximum number of time domain units occupied by the first time-frequency resource in the time-frequency resources of the group of multi-slot is 3.

In an implementation, the maximum number of time domain units occupied by the first time-frequency resource in the time-frequency resources of the group of multi-slot is proportional to the number of time domain units included in the time-frequency resources of the group of multi-slot.

In an example, the number of slots included in the time-frequency resources of the group of multi-slot is 4, and the maximum number of time domain units occupied by the first time-frequency resource in the time-frequency resources of the group of multi-slot is 2; and the number of slots included in the time-frequency resources of the group of multi-slot is 8, and the maximum number of time domain units occupied by the first time-frequency resource in the time-frequency resources of the group of multi-slot is 4.

In the embodiment of the disclosure, the maximum number of time domain units occupied by the first time-frequency resource in the time-frequency resources of the group of multi-slot relates to the number of time domain units included in the time-frequency resources of the group of multi-slot, thus the maximum number of time domain units occupied by the first time-frequency resource in the time-frequency resources of the group of multi-slot can be adjusted accordingly according to the slot groups with different time domain resources, so that the maximum number of time domain units occupied by the first time-frequency resource in the time-frequency resources of the group of multi-slot can be set in a more intelligent manner.

A method for transmitting configuration information of a PDCCH is provided by the embodiment of the disclosure. The method includes the following steps.

The network device 102 sends the configuration information of the PDCCH to the UE 101, in which the configuration information of the PDCCH is configured to indicate a first time-frequency resource, and the first time-frequency resource is configured to send the PDCCH and is located in a plurality of consecutive time domain units of a group of multi-slot.

The UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

When the maximum number of time domain units occupied in the time-frequency resources of the group of multi-slot relates to a subcarrier spacing (SCS), the maximum number of time domain units occupied by the first time-frequency resource in the time-frequency resources of the group of multi-slot relates to the SCS.

In an implementation, the maximum number of time domain units occupied by the first time-frequency resource in the time-frequency resources of the group of multi-slot is positively correlated to the SCS.

In an example, when the SCS is 480 KHz, the number of slots included in the group of multi-slot is 4, and the maximum number of PDCCH slots included in the group of multi-slot is 2; and when the SCS is 960 KHz, the number of slots included in the group of multi-slot is 8, and the maximum number of PDCCH slots included in the group of multi-slot is 3.

In an implementation, the maximum number of time domain units occupied by the first time-frequency resource in the time-frequency resources of the group of multi-slot is proportional to the SCS.

In an example, when the SCS is 480 KHz, the number of slots included in the group of multi-slot is 4, and the maximum number of PDCCH slots included in the group of multi-slot is 2; and when the SCS is 960 KHz, the number of slots included in the group of multi-slot is 8, and the maximum number of PDCCH slots included in the group of multi-slot is 4.

A method for transmitting configuration information of a PDCCH is provided by the embodiment of the disclosure. The method includes the following steps.

The network device 102 sends the configuration information of the PDCCH to the UE 101, in which the configuration information of the PDCCH is configured to indicate a first time-frequency resource, and the first time-frequency resource is configured to send the PDCCH and is located in a plurality of consecutive time domain units of a group of multi-slot.

The UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

A number of consecutive orthogonal frequency division multiplexing (OFDM) symbols occupied by a CORESET corresponding to the first time-frequency resource in a time domain unit is greater than 3.

In the embodiment of the disclosure, the number of consecutive OFDM symbols occupied by the CORESET corresponding to the first time-frequency resource in a time domain unit is greater than 3, which can improve an energy saving efficiency. Compared to setting the number of consecutive OFDM symbols occupied by the CORESET corresponding to the first time-frequency resource in a time domain unit as 3, it can complete transmission of data with the same load on as few time domain resources as possible when a number of time domain symbols in the CORESET is large.

A method for transmitting configuration information of a PDCCH is provided by the embodiment of the disclosure. The method includes the following steps.

At step S10-1, the UE 101 sends a number of consecutive OFDM symbols occupied in the time domain by the CORE-SET supported by the UE 101 to the network device 102.

At step S10-2, the network device 102 receives the number of consecutive OFDM symbols occupied in the time domain by the CORESET supported by the UE 101 from the UE 101.

At step S21, the network device 102 sends the configuration information of the PDCCH to the UE 101, in which the configuration information of the PDCCH is configured to indicate a first time-frequency resource, and the first time-frequency resource is configured to send the PDCCH and is located in a plurality of consecutive time domain units of a group of multi-slot.

At step S22, the UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

In the embodiment of the disclosure, the UE 101 sends the number of consecutive OFDM symbols occupied in the time domain by the CORESET supported by the UE to the network device 102, to inform the network device 102 of the capability of the UE 101, so that the number of consecutive OFDM symbols can be used appropriately.

A method for transmitting configuration information of a PDCCH is provided by the embodiment of the disclosure. The method includes the following steps.

At step S10-1, the UE 101 sends a number of consecutive OFDM symbols occupied in a time domain by a CORESET supported by the UE 101 to the network device 102.

At step S10-2, the network device 102 receives the number of consecutive OFDM symbols occupied in the time domain by the CORESET supported by the UE 101 from the UE 101.

At step S10-3, the network device 102 determines a number of consecutive OFDM symbols occupied by a CORESET corresponding to a first time-frequency resource in a time domain unit based on the number of consecutive OFDM symbols occupied by the CORESET supported by the UE in the time domain.

At step S21, the network device 102 sends the configuration information of the PDCCH to the UE 101, in which the configuration information of the PDCCH is configured to indicate the first time-frequency resource, and the first time-frequency resource is configured to send the PDCCH and is located in a plurality of consecutive time domain units of a group of multi-slot.

At step S22, the UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

In an implementation, the maximum number of time domain symbols in the CORESET supported by the UE 101 relates to a data processing capability of the UE 101.

In an implementation, the maximum number of time domain symbols in the CORESET supported by the UE 101 relates to the SCS.

In an example,
  when the SCS is less than or equal to 120 KHz, the maximum number of time domain symbols in the CORESET supported by the UE is 3;
  when the SCS is equal to 480 KHz, the maximum number of time domain symbols in the CORESET supported by the UE is 4; and
  when the SCS is equal to 960 KHz, the maximum number of time domain symbols in the CORESET supported by the UE is 6.

In an implementation, the maximum number of time domain symbols in the CORESET supported by the UE 101 relates to the data processing capacity of the UE 101 and the SCS.

In the embodiment of the disclosure, the UE 101 reports the number of consecutive OFDM symbols occupied by the CORESET supported by itself in the time domain, and the network device 102 determines the number of consecutive OFDM symbols occupied by the CORESET corresponding to the first time-frequency resource in the time domain unit based on the number of consecutive OFDM symbols occupied by the CORESET supported by the UE in the time domain, so that the determined number of consecutive OFDM symbols occupied by the CORESET corresponding to the first time-frequency resource in the time domain unit can be configured to match with the capability of the UE.

A method for transmitting configuration information of a PDCCH is provided by the embodiment of the disclosure. The method includes the following steps.

At step S10-1, the UE 101 sends a number of consecutive OFDM symbols occupied in the time domain by the CORE-SET supported by the UE 101 to the network device 102.

At step S10-2, the network device 102 receives the number of consecutive OFDM symbols occupied in the time domain by the CORESET supported by the UE 101 from the UE 101.

At step S10-4, the network device 102 determines that a number of consecutive OFDM symbols occupied by the CORESET corresponding to a first time-frequency resource in the time domain unit is greater than 3 and less than the number of consecutive OFDM symbols occupied by the CORESET supported by the UE 101 in the time domain, based on the number of consecutive OFDM symbols occupied by the CORESET supported by the UE in the time domain.

At step S21, the network device 102 sends the configuration information of the PDCCH to the UE 101, in which the configuration information of the PDCCH is configured to indicate the first time-frequency resource, and the first time-frequency resource is configured to send the PDCCH and is located in a plurality of consecutive time domain units of a group of multi-slot.

At step S22, the UE 101 receives the configuration information of the PDCCH from the network device 102, in which the configuration information of the PDCCH is configured to indicate the first time-frequency resource, and the first time-frequency resource is configured to send the PDCCH and is located in the plurality of consecutive time domain units of the group of multi-slot.

In the embodiment of the disclosure, the number of time domain symbols of the CORESET corresponding to the PDCCH on the PDCCH slot in the group of multi-slot is greater than 3 and less than or equal to the number of consecutive OFDM symbols occupied by the CORESET supported by the UE 101 in the time domain, thus the determined number of consecutive OFDM symbols occupied by the CORESET corresponding to the first time-frequency resource on the time domain unit is increased based on the commonly used 3 symbols and it is within the capability scope of the UE, so that the determined result is more reasonable.

Based on the same concept as the above method embodiments, the embodiment of the disclosure also provides a communication device, which has the function of the network device 102 in the above method embodiments and can be used to implement steps performed by the network device 102 provided by the method embodiments. This function can be implemented by hardware, and can also be implemented by software or by executing corresponding software using hardware. The hardware or software includes one or more modules corresponding to the above functions.

Figure 3:
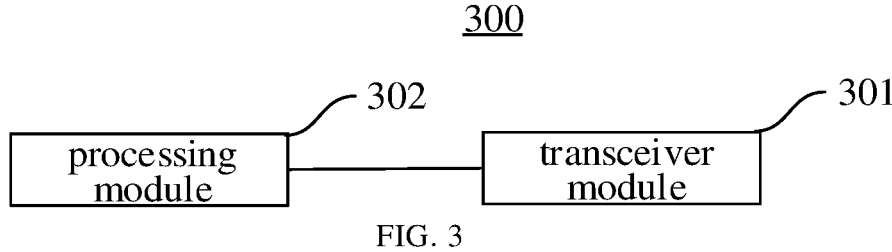
FIG. 3 is a structural diagram of an apparatus for transmitting configuration information of a PDCCH provided by an embodiment of the disclosure.

In a possible implementation, the communication device 300 as illustrated in FIG. 3 may act as the network device involved in the above method embodiments and implement the steps performed by the network device in the above method embodiments. As illustrated in FIG. 3, the communication device 300 may include a transceiver module 301 and a processing module 302 that are coupled to each other. The transceiver module 301 is configured to support the communication device 300 to perform communication. The transceiver module 301 may have a wireless communication function, such as performing wireless communication with other communication devices via a wireless interface. The processing module 302 is configured to support the communication device 300 in performing the processing actions in the above method embodiments, which include but are not limited to: generating information and messages sent by the transceiver module 301, and/or demodulating or decoding signals received by the transceiver module 301.

When performing the steps implemented by the network device 102, the transceiver module 301 is configured to send configuration information of a PDCCH to a UE, in which the configuration information of the PDCCH is configured to indicate a first time-frequency resource, and the first time-frequency resource is configured to send the PDCCH and is located in a plurality of consecutive time domain units of a group of multi-slot.

A maximum number of time domain units occupied by the first time-frequency resource in time-frequency resources of the group of multi-slot relates to a number of time domain units included in the time-frequency resources of the group of multi-slot. Or, the maximum number of time domain units occupied by the first time-frequency resource in the time-frequency resources of the group of multi-slot relates to a SCS.

A number of consecutive OFDM symbols occupied by a CORESET corresponding to the first time-frequency resource in a time domain unit is greater than 3.

The transceiver module is configured to receive a number of consecutive OFDM symbols occupied by a CORESET supported by the UE in a time domain from the UE.

The processing module 302 is configured to determine a number of consecutive OFDM symbols occupied by a CORESET corresponding to the first time-frequency resource in a time domain unit based on the number of consecutive OFDM symbols occupied by the CORESET supported by the UE in the time domain.

The processing module 302 is configured to determine that the number of consecutive OFDM symbols occupied by the CORESET corresponding to the first time-frequency resource in the time domain unit is greater than 3 and less than the number of consecutive OFDM symbols occupied by the CORESET supported by the UE 101 in the time domain.

Figure 4:
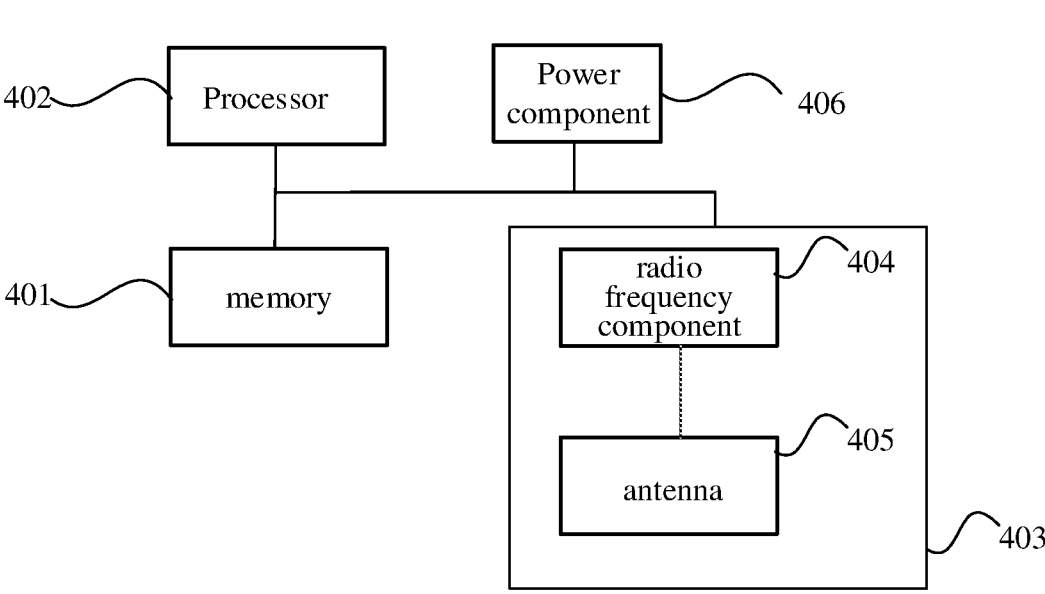
FIG. 4 is a structural diagram of an apparatus for transmitting configuration information of a PDCCH provided by an embodiment of the disclosure.

When the communication device is the network device 102, its structure may be shown in FIG. 4. The structure of the communication device is illustrated by taking a BS as an example. As illustrated in FIG. 4, the device 400 includes a memory 401, a processor 402, a transceiver component 403, and a power component 406. The memory 401 is coupled to the processor 402 and is configured to store programs and data necessary for the communication device 400 to realize each function. The processor 402 is configured to support the communication device 400 in performing the corresponding functions in the method described above, and the functions may be realized by calling the programs stored in the memory 401. The transceiver component 403 may be a wireless transceiver configured to support the communication device 400 in receiving and transmitting signaling and/or data via a wireless interface. The transceiver component 403 may also be referred to as a transceiver unit or a communication unit. The transceiver component 403 may include a radio frequency component 404 and one or more antennas 405. The radio frequency component 404 may be a remote radio unit (RRU), which may be specifically used for transmission of radio frequency signals and conversion of radio frequency signals and baseband signals. The one or more antennas 405 may be specifically used for radiating and receiving radio frequency signals.

When the communication device 400 needs to send data, the processor 402 may output a baseband signal to the radio frequency unit after performing baseband processing on the data to be sent, and the radio frequency unit may send a radio frequency signal through the antenna in the form of electromagnetic waves after performing radio frequency processing on the baseband signal. When data is sent to the communication device 400, the radio frequency unit receives the radio frequency signal through the antenna, converts the radio frequency signal to a baseband signal, and outputs the baseband signal to the processor 402, and the processor 402 converts the baseband signal to data and processes the data.

Based on the same concept as the above method embodiments, the embodiments of the disclosure also provide a communication device that may have a function of the UE 101 in the above method embodiments and may be used to perform the steps performed by the UE 101 in the above method embodiments. The function may be realized by hardware, or may be realized by software or by executing corresponding software using hardware. The hardware or software includes one or more modules corresponding to the above-described function.

Figures 5, 6:
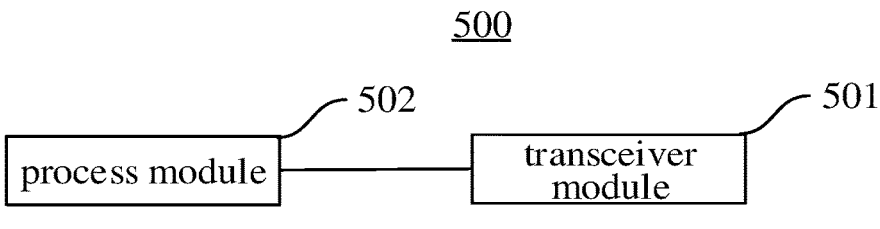
FIG. 5 is a structural diagram of an apparatus for transmitting configuration information of a PDCCH provided by an embodiment of the disclosure.
FIG. 6 is a structural diagram of an apparatus for transmitting configuration information of a PDCCH provided by an embodiment of the disclosure.

In a possible implementation, the communicating device 500 as shown in FIG. 5 may act as the UE involved in the above method embodiments and implement the steps performed by the UE in the above method embodiments. As illustrated in FIG. 5, the communicating device 500 may include a transceiver module 501 and a process module 502 that are coupled to each other. The transceiver module 501 may be configured to support the communicating device 500 for communication, which may have a wireless communication function, such as performing wireless communication with other communication devices via a wireless interface. The process module 502 is configured to support the communicating device 500 in performing the processing actions in the above method embodiments, which include but are not limited to: generating information and messages sent by the transceiver module 501, and/or demodulating or decoding signals received by the transceiver module 501.

When performing the steps performed by the network device 102, the transceiver module is configured to receive configuration information of a PDCCH from a network device, in which the configuration information of the PDCCH is configured to indicate a first time-frequency resource, and the first time-frequency resource is configured to send the PDCCH and is located in a plurality of consecutive time domain units of a group of multi-slot.

A maximum number of time domain units occupied by the first time-frequency resource in time-frequency resources of the group of multi-slot relates to a number of time domain units included in the time-frequency resources of the group of multi-slot. Or, the maximum number of time domain units occupied by the first time-frequency resource in the time-frequency resources of the group of multi-slot relates to a SCS.

A number of consecutive OFDM symbols occupied by a CORESET corresponding to the first time-frequency resource in a time domain unit is greater than 3.

The transceiver module is configured to send a number of consecutive OFDM symbols occupied by a CORESET supported by the UE in a time domain to the network device, in which the number of consecutive OFDM symbols occupied by the CORESET supported by the UE in the time domain is configured to cause the network device to determine the number of consecutive OFDM symbols occupied by the CORESET corresponding to the first time-frequency resource in the time domain unit based on the number of consecutive OFDM symbols occupied by the CORESET supported by the UE in the time domain.

When the communication device is the UE 101, its structure may also be as shown in FIG. 6. The device 600 may be a mobile phone, a computer, a digital broadcasting terminal, a message transceiver device, a game console, a tablet device, a medical device, a fitness device and a personal digital assistant.

As illustrated in FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone call, data communication, camera operation, and recording operation. The processing component 602 may include one or more processors 620 to perform instructions to implement all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front-facing camera and/or a rear-facing camera. When the device 600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 610 is configured to output and/or input audio signals. For example, the audio component 610 includes a microphone (MIC) configured to receive an external audio signal when the device 600 is in an operation mode, such as a calling mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of a user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a Complementary Metal Oxide Semiconductor (CMOS) or Charge-Coupled Device (CCD) image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In an exemplary embodiment, the communication component 616 receives a broadcast signal from an external broadcast management system or broadcast associated information via a broadcast channel. In an exemplary embodiment, the communication component 616 further includes a Near Field Communication (NFC) module to facilitate short-range communication. For example, the NFC module may be implemented based on a radio-frequency identification (RFID) technology, an Infrared Data Association (IrDA) technology, an Ultra-Wide Band (UWB) technology, a Blue Tooth (BT) technology, and other technologies.

In the exemplary embodiment, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the exemplary embodiments, there is also provided a non-transitory computer readable storage medium including instructions, such as the memory 604 including instructions. The instructions can be executed by the processor 620 in the device 600, for implementing the above methods. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting configuration information of a physical downlink control channel (PDCCH), performed by a network device, comprising:

sending the configuration information of the PDCCH to a user equipment, wherein the configuration information of the PDCCH indicates a first time-frequency resource, and the first time-frequency resource is configured to send the PDCCH and is located in a plurality of consecutive time domain units of a group of multi-slot;

wherein a maximum number of time domain units occupied by the first time-frequency resource in time-frequency resources of the group of multi-slot relates to one of:

a number of time domain units contained in the time-frequency resources of the group of multi-slot; or a subcarrier spacing.

2. The method of claim 1, wherein a first number of symbols is greater than 3, and the first number of symbols is a number of consecutive orthogonal frequency division multiplexing (OFDM) symbols occupied by a control resource set corresponding to the first time-frequency resource in a time domain unit.

3. The method of claim 2, further comprising:

receiving a second number of symbols from the user equipment, wherein the second number of symbols is a number of consecutive OFDM symbols occupied by a control resource set supported by the user equipment in a time domain.

4. The method of claim 3, further comprising:

determining the first number of symbols according to the second number of symbols.

5. The method of claim 4, further comprising:

determining the first number of symbols being greater than 3 and less than the second number of symbols.

6. The method of claim 1, wherein the maximum number of time domain units occupied by the first time-frequency resource in the time-frequency resources of the group of multi-slot is positively correlated with, or proportional to, the number of time domain units contained in the time-frequency resources of the group of multi-slot.

7. A method for transmitting configuration information of a PDCCH, performed by a user equipment, comprising:

receiving the configuration information of the PDCCH from a network device, wherein the configuration information of the PDCCH indicates a first time-frequency resource, and the first time-frequency resource is configured to send the PDCCH and is located in a plurality of consecutive time domain units of a group of multi-slot;

wherein a maximum number of time domain units occupied by the first time-frequency resource in time-frequency resources of the group of multi-slot relates to one of:

a number of time domain units contained in the time-frequency resources of the group of multi-slot; or a subcarrier spacing.

8. The method of claim 7, wherein a first number of symbols is greater than 3, and the first number of symbols is a number of consecutive OFDM symbols occupied by a control resource set corresponding to the first time-frequency resource in a time domain unit.

9. The method of claim 8, further comprising:

sending a second number of symbols to the network device, wherein the second number of symbols is a number of consecutive OFDM symbols occupied by a control resource set supported by the user equipment in a time domain, wherein the second number of symbols is configured to cause the network device to determine the first number of symbols according to the second number of symbols.

10. A user equipment, comprising:

a processor; and a memory configured to store computer programs;

wherein the processor is configured to perform the method of claim 7.

11. A non-transitory computer-readable storage medium having stored thereon instructions that, when executed by a processor of a network device, cause the network device to perform the method claim 1.

12. A non-transitory computer-readable storage medium having stored thereon instructions that, when executed by a processor of a user equipment, cause the user equipment to perform the method claim 7.

13. A network device, comprising:

a processor; and a memory configured to store computer programs;

wherein the processor is configured to:

send configuration information of a physical downlink control channel (PDCCH) to a user equipment, wherein the configuration information of the PDCCH indicates a first time-frequency resource, and the first time-frequency resource is configured to send the PDCCH and is located in a plurality of consecutive time domain units of a group of multi-slot;

wherein a maximum number of time domain units occupied by the first time-frequency resource in time-frequency resources of the group of multi-slot relates to one of:

a number of time domain units contained in the time-frequency resources of the group of multi-slot; or a subcarrier spacing.

14. The network device of claim 13, wherein a maximum number of time domain units occupied by the first time-frequency resource in time-frequency resources of the group of multi-slot relates to one of: a number of time domain units contained in the time-frequency resources of the group of multi-slot, or a subcarrier spacing.

15. The network device of claim 13, wherein a first number of symbols is greater than 3, and the first number of symbols is a number of consecutive orthogonal frequency division multiplexing (OFDM) symbols occupied by a control resource set corresponding to the first time-frequency resource in a time domain unit.

16. The network device of claim 15, wherein the processor is further configured to:

receive a second number of symbols from the user equipment, wherein the second number of symbols is a number of consecutive OFDM symbols occupied by a control resource set supported by the user equipment in a time domain.

17. The network device of claim 16, wherein the processor is further configured to:

determine the first number of symbols according to the second number of symbols.

18. The network device of claim 17, wherein the processor is further configured to:

determine the first number of symbols being greater than 3 and less than the second number of symbols.

* * * * *